Sept. 12, 1967  D. F. SALT  3,340,721
PRESS TOOLS
Filed Nov. 6, 1964

INVENTOR:
Douglas Frank Salt
BY
Bierman & Bierman

United States Patent Office 3,340,721
Patented Sept. 12, 1967

3,340,721
PRESS TOOLS
Douglas F. Salt, 46 Stanwell Road, Swinton,
Manchester, England
Filed Nov. 6, 1964, Ser. No. 409,525
4 Claims. (Cl. 72—395)

This invention relates to press tools and in particular to jaw units of presses for upsetting metal, of the kind hereinafter termed the kind referred to, comprising two pairs of work-engaging jaws, the jaws of each pair being adapted to engage the same side of the work and having their working faces lying in a common plane and relatively movable in that plane, such working faces being provided with fine oppositely directed metal-gripping teeth, said jaws of each pair being mounted in a holder with complementary compacting inclined surfaces on the jaws and in the holder so as to effect the relative movement together of the jaws of each pair under load against the other pair thereby upsetting the metal between the zones gripped by the complementary opposing jaws.

Generally, the object and purpose of such shrinkage or upsetting treatment of metal is to produce or permit curvature of the metal in the plane of its thickness so that, for example, a straight line drawn on a flat piece of metal would become an arc in the same plane after such treatment, that portion of the metal remaining substantially flat.

It is necessary with such a tool to provide a "pre-loading" or gripping pressure of the jaws, against the faces of the metal to be upset, before relative upsetting movement of the jaws is initiated, thereby to provide effective frictional working engagement of the jaws with the surfaces of the metal, including some minute embedding into said surface by the fine metal-gripping teeth provided on the working faces of the jaws. Hitherto, such pre-loading has been provided by a compression device, such as springs, which resist downward movement of the jaws in their holders necessary for causing such relative upsetting movement of the jaws towards each other. In my co-pending application for Patent No. 3,004/60 "pre-loading" is provided through a wedge slidably located between the jaws which wedge also serves to support and restrain the ungripped area of metal between the jaws from buckling during "upsetting". The arcuate shape of the complementary faces on the jaws and wedge as earlier described have provided, at the wider end of the wedge, an included angle such that the loading of the wedge by its return spring would provide only negligible pre-loading for the jaws ineffective for providing the aforesaid frictional working engagement.

The present invention is based upon the appreciation that a work-supporting surface is not always necessary and in particular that the location of such wedge, as a means for effecting "pre-loading," introduces an undesirable force-couple which is applied to the jaws and adversely affects the distribution of load thereon. This force-couple tends to cause tilting of the jaws, with resultant localised wear on part of the complementary surfaces of the jaws and their holder, since both the resistance of the metal during compacting and the spring loading of the wedge for "pre-loading" are at the working surface while the oppositely directed compacting force is generated at the opposite faces of the jaws away from the working surface.

According to the present invention a jaw unit of the kind referred to and having a wedge located between the jaws and loaded axially and so shaped as to its angle relative to such loading to the compacting angle (as hereinbefore defined) of the jaws as to provide a predetermined pre-load on the work before compacting movement of the jaws can occur is characterised in that the wedge is located away from the working surface of the jaws and nearer than such surface to the compacting inclined surfaces on the jaws and on the holder.

The aforesaid jaw unit may have at such working plane, a gap and no work-supporting surface to prevent buckling of the metal, or a wedge may be provided similar to that described in the earlier specification aforesaid to give work support, so shaped and so lightly loaded as to be sufficient to maintain its location between the jaws but without causing avoidable "pre-loading."

In the drawings filed with the provisional specification:

Figure 1:
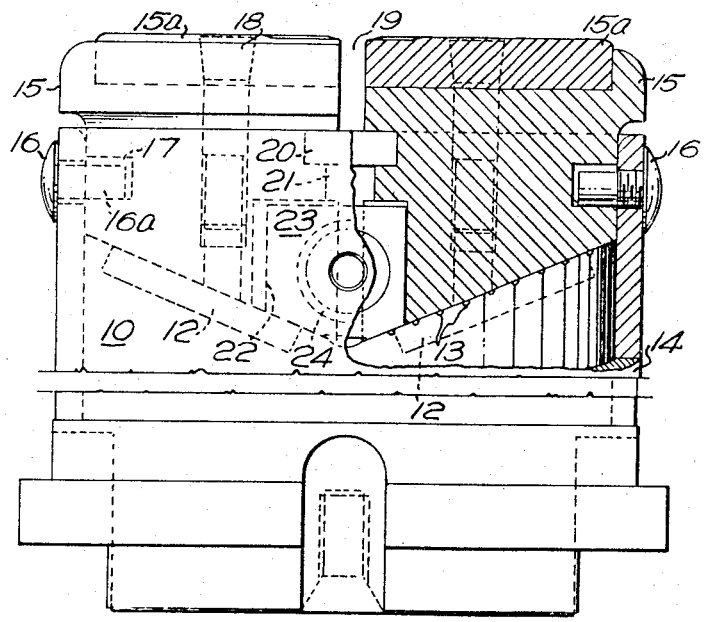
FIG. 1 is a part sectional elevation of one jaw unit having a pair of jaws and made in accordance with one example of the present invention.
Figure 2:
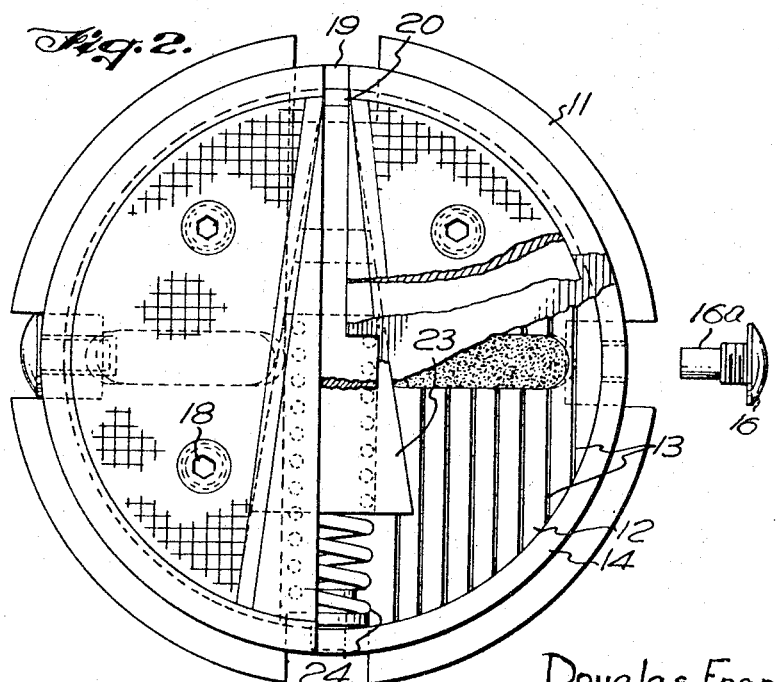
FIG. 2 is a part sectional plan of the unit shown in FIG. 1.

As shown in the drawing the jaw unit comprises a cylindrical body 10, adapted at 11 to be fitted to an upsetting machine or press, the top of such body being V-shaped to an angle of 135 degrees (including angle) and provided with renewable inserts 12 formed with lubricating surface grooves 13. A lubricant-holding wick 12a is housed in each insert. Located on and extending above such body is a sleeve 14 adapted to form a housing for a pair of relatively movable jaws 15, each having an inclined under face complementary to the inserts 12 aforesaid. Each jaw is retained by a set screw 16 located in the side of the sleeve and having its end 16a engaging a clearance recess 17 in the side of the jaw. The working surface of each jaw is provided with a renewable insert 15a formed in known manner with a plurality of fine saw-shaped teeth those in one jaw being opposed to those in the other. The inserts are secured by studs 18. Between the jaws is a transverse clearance space 19 which extends for their full depth and defines the limit of relative movement. Between the jaws is a resilient insert 20 of rubber located in a slot, with a space 21 below the rubber for displacement thereof under compression, the main function of such rubber being to act as a protective seal for the sliding surfaces below it against any matter falling between the jaws. Such slot and resilient insert are of uniform cross sectional dimensions. On the underside of each jaw is a tapered rebate 22 in which is located a tapered wedge 23 loaded axially towards its smaller end by a coil spring 24.

In use a press or upsetting machine will be fitted with two jaw units and when they are loaded towards each other, inward movement of the jaws relative to their housing is resisted by the resilient insert 20 but mainly by the load of the spring 24 on the wedge 23 which has to move to compress such spring before relative movement of the jaws can occur. By reason of location of the wedge close to the inclined working faces of the inserts 12, any force couple from the wedge tending to tilt the jaws is reduced to a minimum and this has been found to give greatly improved results and longer life to the working parts of the jaws.

In a modification, not illustrated, a further wedge may be provided at the working surface of the jaws to provide work support bridging the gap between the inserts 13a as is described in the specification of my earlier patent application No. 3,804/60. Such further wedge would require only light spring loading to keep it in position and therefore the main factor of pre-loading is obtained from the main wedge adjacent the inclined compacting surfaces of the jaw unit.

I claim:

1. In an upsetting tool comprising at least one pair of work engaging jaws having working faces, each of said jaws adapted to engage the same side of the work, said faces lying in a common plane and movable relative to each other in said plane, said jaws mounted in a holder, complementary compacting inclined surfaces on said jaws and on said holder whereby pressure normal to said faces effects relative movement of said jaws toward one another thereby upsetting metal between areas gripped by said faces, the improvement which comprises a first wedge between said jaws, said first wedge being loaded axially, wherein said first wedge is located nearer to said compacting inclined surfaces than to said faces.

2. A jaw unit according to claim 1 further characterised by a seal between the jaws for protecting the sliding surfaces below it from any matter falling between the jaws.

3. A jaw unit according to claim 2 further characterised in that the protective seal comprises a resilient insert located in slots in the opposite faces of the jaws.

4. A tool according to claim 1 wherein a second wedge having an upper surface is located between said jaws, said upper surface being in substantially the same plane as said faces, said second wedge being lightly loaded axially whereby it will maintain its position without causing appreciable pre-loading.

References Cited

UNITED STATES PATENTS

| | | | |
|---|---|---|---|
| 2,010,996 | 8/1935 | Junkers | 72—395 |
| 2,364,938 | 12/1944 | Beard | 72—395 |

FOREIGN PATENTS 137,102 11/1959 U.S.S.R.

WILLIAM W. DYER, JR., *Primary Examiner.*

G. A. POST, *Assistant Examiner.*